(12) United States Patent
Ogami et al.

(10) Patent No.: US 11,811,348 B2
(45) Date of Patent: Nov. 7, 2023

(54) INVERTER CONTROLLER AND VEHICLE ON-BOARD FLUID MACHINE

(71) Applicant: KABUSHIKI KAISHA TOYOTA JIDOSHOKKI, Kariya (JP)

(72) Inventors: Takashi Ogami, Kariya (JP); Takashi Kawashima, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 63 days.

(21) Appl. No.: 17/322,049

(22) Filed: May 17, 2021

(65) Prior Publication Data

US 2021/0367545 A1 Nov. 25, 2021

(30) Foreign Application Priority Data

May 20, 2020 (JP) .................................. 2020-088095

(51) Int. Cl.
*H02P 27/08* (2006.01)
*B60H 1/32* (2006.01)
*H02P 21/22* (2016.01)

(52) U.S. Cl.
CPC ......... *H02P 27/085* (2013.01); *B60H 1/3222* (2013.01); *B60H 2001/3292* (2013.01); *H02P 21/22* (2016.02)

(58) Field of Classification Search
CPC .......... B60H 1/3222; B60H 2001/3292; H02P 27/08; H02P 27/085; H02P 21/22

USPC ........................................................ 318/811
See application file for complete search history.

(56) References Cited

U.S. PATENT DOCUMENTS

| | | |
|---|---|---|
| 2015/0311845 A1 | 10/2015 | Nagata et al. |
| 2018/0102723 A1* | 4/2018 | Kawashima ............ H02P 21/22 |
| 2021/0214000 A1* | 7/2021 | Miki ....................... H02P 21/06 |

FOREIGN PATENT DOCUMENTS

JP 2015-208187 A 11/2015

* cited by examiner

*Primary Examiner* — Kawing Chan
*Assistant Examiner* — Zemenay T Truneh
(74) *Attorney, Agent, or Firm* — Sughrue Mion, PLLC

(57) ABSTRACT

An inverter controller is used to control an inverter circuit, which drives a vehicle on-board electric motor using a vehicle on-board electricity storage device. A rotation controlling unit of the inverter controller executes a process that derives two-phase voltage command values based on an external command value delivered from an external device and an actual rotation speed, and a process that derives three-phase voltage command values based on the two-phase voltage command values. In a case in which a voltage utilization factor is less than or equal to a utilization factor threshold, the rotation controlling unit derives, by switching at a switching period, sets of three-phase voltage command values of which the line voltages of the vehicle on-board electric motor are the same and the variation ranges are different.

8 Claims, 5 Drawing Sheets

INVERTER CONTROLLER AND VEHICLE ON-BOARD FLUID MACHINE

BACKGROUND

1. Field

The present disclosure relates to an inverter controller and a vehicle on-board fluid machine.

2. Description of Related Art

For example, Japanese Laid-Open Patent Publication No. 2015-208187 discloses an inverter controller used to control an inverter circuit that drives a vehicle on-board electric motor by using a vehicle on-board electricity storage device. Japanese Laid-Open Patent Publication No. 2015-208187 discloses that the vehicle on-board electric motor is used as a motor of an air conditioner for an automobile and includes three-phase coils, and that the inverter circuit includes three-phase switching elements. Japanese Laid-Open Patent Publication No. 2015-208187 also discloses that a drive voltage, which includes three-phase voltage command values, is calculated based on two-phase voltage command values that include an exciting component voltage and a torque component voltage.

The three-phase voltage command values become the same values periodically, which may generate noise of a specific frequency. Particularly, in a situation where a voltage utilization factor, which is calculated based on the two-phase voltage command values and the voltage of the vehicle on-board electricity storage device, is low, the noise of the specific frequency is likely to increase in relation to the three-phase voltage command values. This creates a concern that an adverse effect of the noise of the specific frequency will increase.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It is an objective of the present disclosure to provide an inverter controller that is capable of reducing noise of a specific frequency generated when three-phase voltage command values periodically become the same value in a situation where the voltage utilization factor is low. Another objective of the present disclosure is to provide a vehicle on-board fluid machine that includes the inverter controller.

In a first aspect, an inverter controller is configured to control an inverter circuit that drives a vehicle on-board electric motor by using a vehicle on-board electricity storage device. The vehicle on-board electric motor includes three-phase coils. The inverter circuit includes three-phase switching elements. The inverter controller includes a speed acquiring unit, a voltage acquiring unit, a two-phase voltage command value deriving unit, a three-phase voltage command value deriving unit, and a generating unit. The speed acquiring unit is configured to acquire a rotation speed of the vehicle on-board electric motor. The voltage acquiring unit is configured to acquire a power supply voltage, which is a voltage of the vehicle on-board electricity storage device. The two-phase voltage command value deriving unit is configured to derive two-phase voltage command values based on an external command value delivered from an external device and an acquisition result of the speed acquiring unit. The two-phase voltage command values are target values of voltages applied to a d-axis and a q-axis of the vehicle on-board electric motor. The three-phase voltage command value deriving unit is configured to derive three-phase voltage command values applied to the three-phase coils based on the two-phase voltage command values. The generating unit is configured to generate a pulse-width modulation signal based on the three-phase voltage command values and a carrier signal. The inverter controller is configured to subject the three-phase switching elements to pulse-width modulation control using the PWM signal. The three-phase voltage command value deriving unit is configured such that, in a case in which a voltage utilization factor, which is calculated based on the two-phase voltage command values and the acquisition result of the voltage acquiring unit, is less than or equal to a predetermined utilization factor threshold, in a situation in which the two-phase voltage command values are the same, the three-phase voltage command value deriving unit derives, by switching at a switching period, sets of the three-phase voltage command values of which line voltages of the three-phase coils are the same and variation ranges are different.

In a second aspect, a vehicle on-board fluid machine includes a vehicle on-board electric motor, an inverter circuit configured to drive the vehicle on-board electric motor by using a vehicle on-board electricity storage device, and the inverter controller of the first aspect, which is configured to control the inverter circuit.

Other aspects and advantages of the present disclosure will become apparent from the following description, taken in conjunction with the accompanying drawings, illustrating exemplary embodiments.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An inverter controller 14 and a vehicle on-board fluid machine equipped with the inverter controller 14 according to an embodiment will now be described. In the present embodiment, the vehicle on-board fluid machine is a vehicle on-board motor-driven compressor 10, which is used in a vehicle on-board air conditioner 101.

An overview of the vehicle on-board air conditioner 101 and the vehicle on-board motor-driven compressor 10 will now be described.

Figure 1:
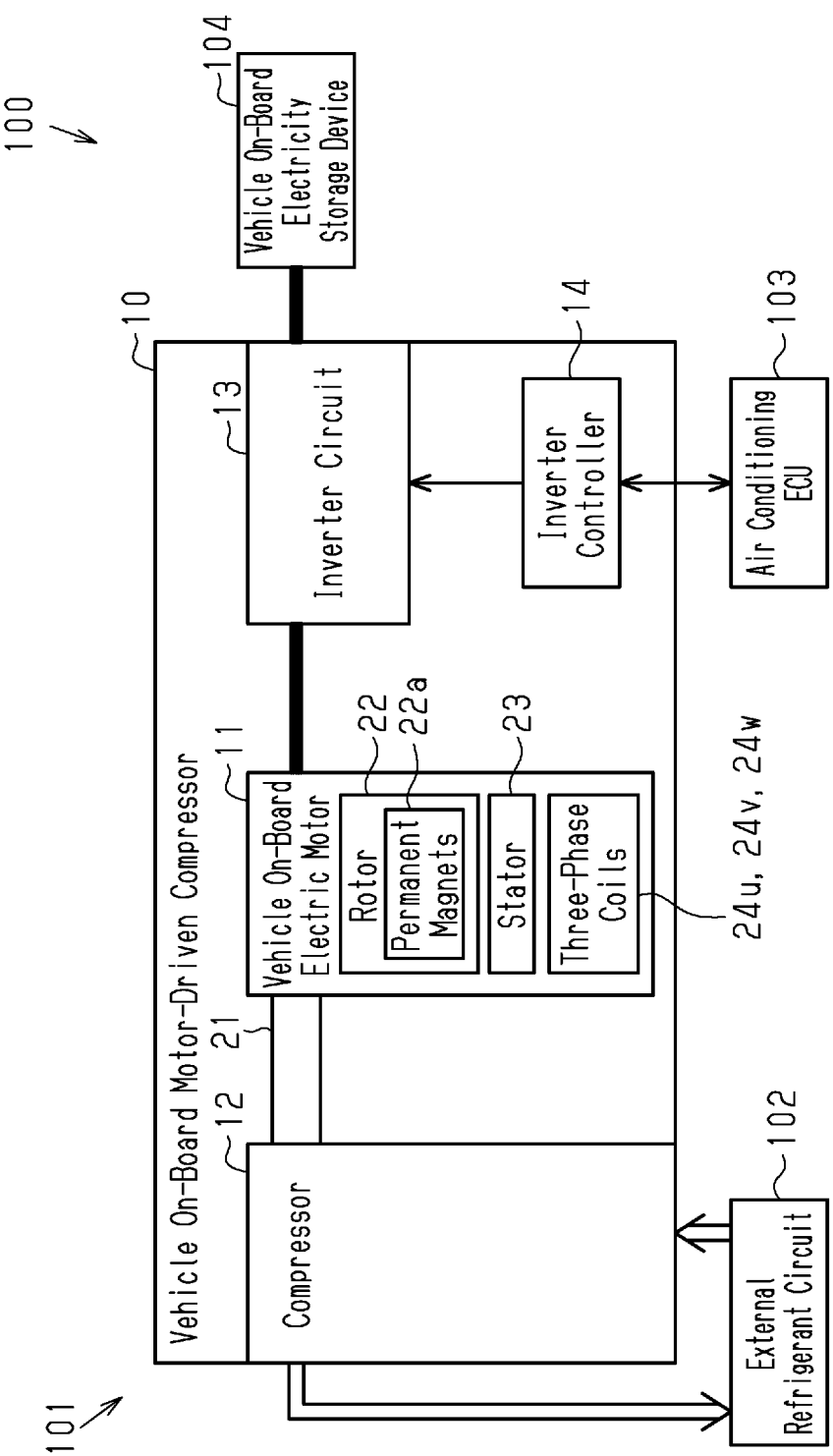
FIG. 1 is a block diagram showing a vehicle on-board motor-driven compressor.

As shown in FIG. 1, the vehicle on-board air conditioner 101, which is mounted in a vehicle 100, includes the vehicle on-board motor-driven compressor 10 and an external refrigerant circuit 102, which supplies refrigerant (fluid) to the vehicle on-board motor-driven compressor 10.

The external refrigerant circuit 102 includes, for example, a heat exchanger and an expansion valve. The vehicle on-board motor-driven compressor 10 compresses the refrigerant. Also, the external refrigerant circuit 102 performs heat exchange of the refrigerant and expands the refrigerant. This allows the vehicle on-board air conditioner 101 to cool or warm the passenger compartment.

The vehicle on-board air conditioner 101 includes an air conditioning ECU 103, which controls the entire vehicle on-board air conditioner 101. The air conditioning ECU 103 is configured to obtain parameters such as the temperature in the passenger compartment and a target temperature of a car air conditioner. Based on these parameters, the air conditioning ECU 103 outputs various commands including a command rotation speed Nc to the vehicle on-board motor-driven compressor 10.

The vehicle 100 includes a vehicle on-board electricity storage device 104. The vehicle on-board electricity storage device 104 may be of any type as long as it can charge/discharge direct-current power. For example, a rechargeable battery or an electric double-layer capacitor may be employed. The vehicle on-board electricity storage device 104 is used as a direct-current power supply for the vehicle on-board motor-driven compressor 10.

The vehicle on-board motor-driven compressor 10 includes a vehicle on-board electric motor 11, a compression unit 12, which is driven by the vehicle on-board electric motor 11, an inverter circuit 13, which drives the vehicle on-board electric motor 11 using the vehicle on-board electricity storage device 104, and the inverter controller 14, which is configured to control the inverter circuit 13.

Figure 2:
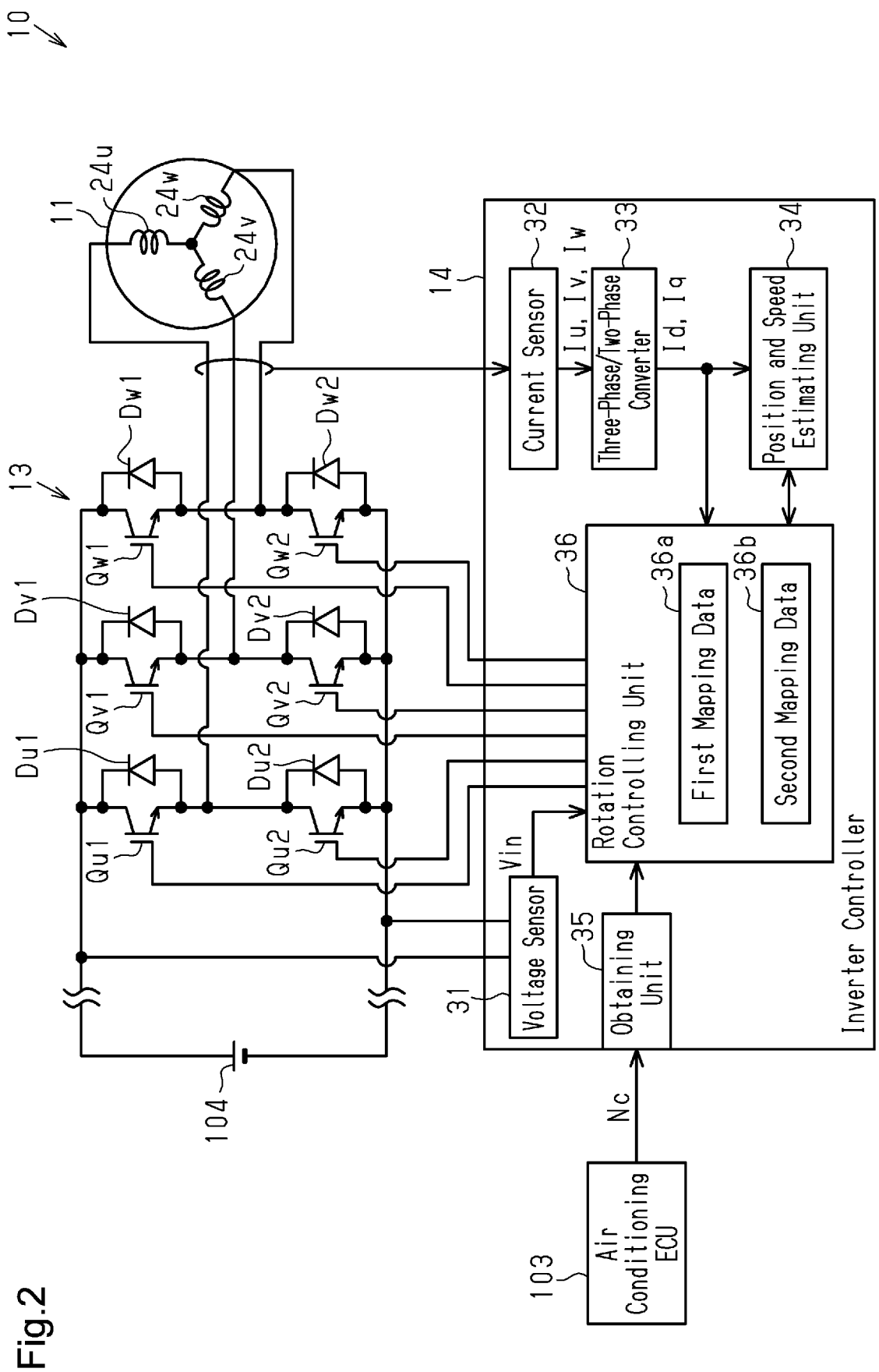
FIG. 2 is a block diagram showing an electrical configuration of an inverter circuit and an inverter controller.

The vehicle on-board electric motor 11 includes a rotary shaft 21, a rotor 22 fixed to the rotary shaft 21, a stator 23 arranged to be opposed to the rotor 22, and three-phase coils 24u, 24v, 24w wound about the stator 23. The rotor 22 includes permanent magnets 22a. Specifically, the permanent magnets 22a are embedded in the rotor 22. As shown in FIG. 2, the three-phase coils 24u, 24v, 24w are connected to form a Y-connection. The rotor 22 and the rotary shaft 21 rotate when the three-phase coils 24u, 24v, 24w are energized in a predetermined pattern. That is, the vehicle on-board electric motor 11 of the present embodiment is a three-phase motor.

The manner in which the three-phase coils 24u, 24v, 24w are connected together is not limited to a Y-connection, but may be a delta connection. The rotation speed and the acceleration of the vehicle on-board electric motor 11 refer to the rotation speed and the acceleration of the rotor 22.

The compression unit 12 is configured to be driven by the vehicle on-board electric motor 11 to compress fluid (refrigerant in the present embodiment). Specifically, when the rotary shaft 21 is rotated, the compression unit 12 compresses the refrigerant drawn from the external refrigerant circuit 102 and discharges the compressed refrigerant. The specific configuration of the compression unit 12 is not particularly limited and may be any type such as a scroll type, a piston type, or a vane type.

The inverter circuit 13 is configured to convert direct-current power supplied from the vehicle on-board electricity storage device 104 into alternate-current power, thereby driving the vehicle on-board electric motor 11 using the vehicle on-board electricity storage device 104.

As shown in FIG. 2, the inverter circuit 13 includes three-phase switching elements Qu1 to Qw2. Specifically, the inverter circuit 13 includes u-phase switching elements Qu1, Qu2, which correspond to the u-phase coil 24u, v-phase switching elements Qv1, Qv2, which correspond to the v-phase coil 24v, and w-phase switching elements Qw1, Qw2, which correspond to the w-phase coil 24w.

The three-phase switching elements Qu1, Qu2, Qv1, Qv2, Qw1, and Qw2 (hereinafter, simply referred to as the three-phase switching elements Qu1 to Qw2) are each a power switching element including an insulated gate bipolar transistor (IGBT). The three-phase switching elements Qu1 to Qw2 are not limited to IGBTs, but may be any type of switching elements. For example, metal-oxide semiconductor field-effect transistors (MOSFETs) may be employed. The three-phase switching elements Qu1 to Qw2 include freewheeling diodes (body diodes) Du1 to Dw2.

The u-phase switching elements Qu1, Qu2 are connected to each other in series by a connection wire that is connected to the u-phase coil 24u. The collector of the u-phase switching element Qu1 is connected to the positive electrode terminal, which is the high-voltage side, of the vehicle on-board electricity storage device 104. The emitter of the u-phase switching element Qu2 is connected to the negative electrode terminal, which is the low-voltage side, of the vehicle on-board electricity storage device 104.

Except for the connected coil, the other switching elements Qv1, Qv2, Qw1, Qw2 have the same connection structure as the u-phase switching elements Qu1, Qu2.

The inverter controller 14 is a controller having electronic components such as a CPU and a memory. The inverter controller 14 controls the inverter circuit 13, more specifically, the three-phase switching elements Qu1 to Qw2, in order to drive the vehicle on-board electric motor 11.

The inverter controller 14 includes a voltage sensor 31. The voltage sensor 31 is a voltage acquiring unit that is configured to acquire a power supply voltage Vin, which is the voltage of the vehicle on-board electricity storage device 104. The voltage sensor 31 acquires the power supply voltage Vin by detecting an input voltage of the inverter circuit 13.

The inverter controller 14 includes a current sensor 32, which detects a motor current that flows through the vehicle on-board electric motor 11. The motor current in the present embodiment includes, for example, three-phase currents Iu, Iv, Iw flowing through the three-phase coils 24u, 24v, 24w.

As shown in FIG. 2, the inverter controller 14 includes a three-phase/two-phase converter 33, which converts the three-phase currents Iu, Iv, Iw detected by the current sensor 32 into a d-axis current Id and a q-axis current Iq (hereinafter referred to as two-phase currents Id, Iq), which are perpendicular to each other.

The d-axis current Id can be regarded as a current of the component in the axial direction of the magnetic flux of the rotor 22, that is, an exciting component current, and the q-axis current Iq can be regarded as a torque component current that contributes to the torque of the vehicle on-board electric motor 11.

The inverter controller 14 includes a position and speed estimating unit (position estimating unit) 34, which estimates the rotational position and rotation speed of the rotor 22. The position and speed estimating unit 34 estimates the rotational position and an actual rotation speed Nr of the rotor 22, for example, based on at least one of a set of the two-phase currents Id, Iq or a set of two-phase voltage command values Vdr, Vqr. Any unit can be used for the command rotation speed Nc and the actual rotation speed Nr. For example, revolutions per minute (rpm) may be employed.

The specific configuration of the position and speed estimating unit 34 is not particularly limited. For example, the position and speed estimating unit 34 may include an induced voltage calculating unit that is configured to calculate an induced voltage in the three-phase coils 24u, 24v, 24w based on the two-phase currents Id, Iq, the d-axis voltage command value Vdr, the motor constant, and the like. In this case, the position and speed estimating unit 34 may estimate the rotational position and the actual rotation speed Nr of the rotor 22 based on the induced voltage and the d-axis current Id of the two-phase currents Id, Iq.

The position and speed estimating unit 34 periodically acquires a detection result of the current sensor 32 and periodically estimates the rotational position and the actual rotation speed Nr of the rotor 22. As a result, the position and speed estimating unit 34 keeps track of the rotational position and the actual rotation speed Nr of the rotor 22. In the present embodiment, the position and speed estimating unit 34 corresponds to a speed acquiring unit, which is configured to acquire the rotation speed of the vehicle on-board electric motor 11.

The inverter controller 14 includes an obtaining unit 35 and a rotation controlling unit (rotation controlling circuit) 36. The obtaining unit 35 obtains an external command value, which is delivered from the air conditioning ECU 103, which is an external device. The rotation controlling unit 36 controls rotation of the vehicle on-board electric motor 11 based on the external command value obtained by the obtaining unit 35 and the actual rotation speed Nr.

The obtaining unit 35 is a connector that electrically connects the air conditioning ECU 103 and the inverter controller 14 to each other. The obtaining unit 35 electrically connects the air conditioning ECU 103 and the inverter controller 14 to each other, so as to allow exchange of information. The obtaining unit 35 can also be regarded as an input unit to which various commands such as the command rotation speed Nc are inputted.

The external command value is, for example, the command rotation speed Nc. Specifically, the air conditioning ECU 103 calculates a necessary flow rate of refrigerant, for example, from the operational state of the vehicle on-board air conditioner 101, and calculates the command rotation speed Nc that achieves the calculated flow rate. The air conditioning ECU 103 delivers the command rotation speed Nc to the inverter controller 14.

The external command value is not limited to the command rotation speed Nc, but any specific command content may be employed as long as the manner in which the vehicle on-board electric motor 11 is driven can be defined. Also, the agent that outputs the external command value is not limited to the air conditioning ECU 103.

The rotation controlling unit 36 is electrically connected to the obtaining unit 35. The rotation controlling unit 36 is electrically connected to the air conditioning ECU 103 via the obtaining unit 35. The rotation controlling unit 36 receives the command rotation speed Nc obtained by the obtaining unit 35. That is, the rotation controlling unit 36 receives an external command value from the air conditioning ECU 103 via the obtaining unit 35.

The rotation controlling unit 36 is electrically connected to the voltage sensor 31 and is capable of acquiring the power supply voltage Vin.

The rotation controlling unit 36 is electrically connected to the position and speed estimating unit 34. Accordingly, the rotation controlling unit 36 is capable of acquiring the rotational position and the actual rotation speed Nr of the rotor 22, which have been estimated by the position and speed estimating unit 34. The rotation controlling unit 36 is also capable of delivering parameters necessary for the estimation to the position and speed estimating unit 34.

The three-phase/two-phase converter 33 delivers the two-phase currents Id, Iq to both of the position and speed estimating unit 34 and the rotation controlling unit 36. This allows the rotation controlling unit 36 to acquire the two-phase currents Id, Iq.

The rotation controlling unit 36 performs pulse-width modulation (PWM) control for the three-phase switching elements Qu1 to Qw2 of the inverter circuit 13, thereby executing a rotation control process that controls rotation of the vehicle on-board electric motor 11 (specifically, the rotor 22). The rotation controlling unit 36 repeatedly executes the rotation control process at a predetermined output period.

The specific hardware configuration of the rotation controlling unit 36 is not particularly limited. For example, the rotation controlling unit 36 may include a memory that stores a program of the rotation control process and necessary information, and a CPU that executes the rotation control process based on the program.

In addition, the rotation controlling unit 36 may include one or more hardware circuits that execute part or all of the rotation control process. Alternatively, the rotation controlling unit 36 may be a combination of one or more hardware circuits and a CPU that executes software processing. In other words, the rotation controlling unit 36 may include, for example, at least one dedicated hardware circuit and at least one processor (control circuit) that operates in accordance with a computer program (software).

For the illustrative purposes, the rotation control process implemented by the rotation controlling unit 36 will be described in accordance with the flowchart of FIG. 3.

Figure 3:
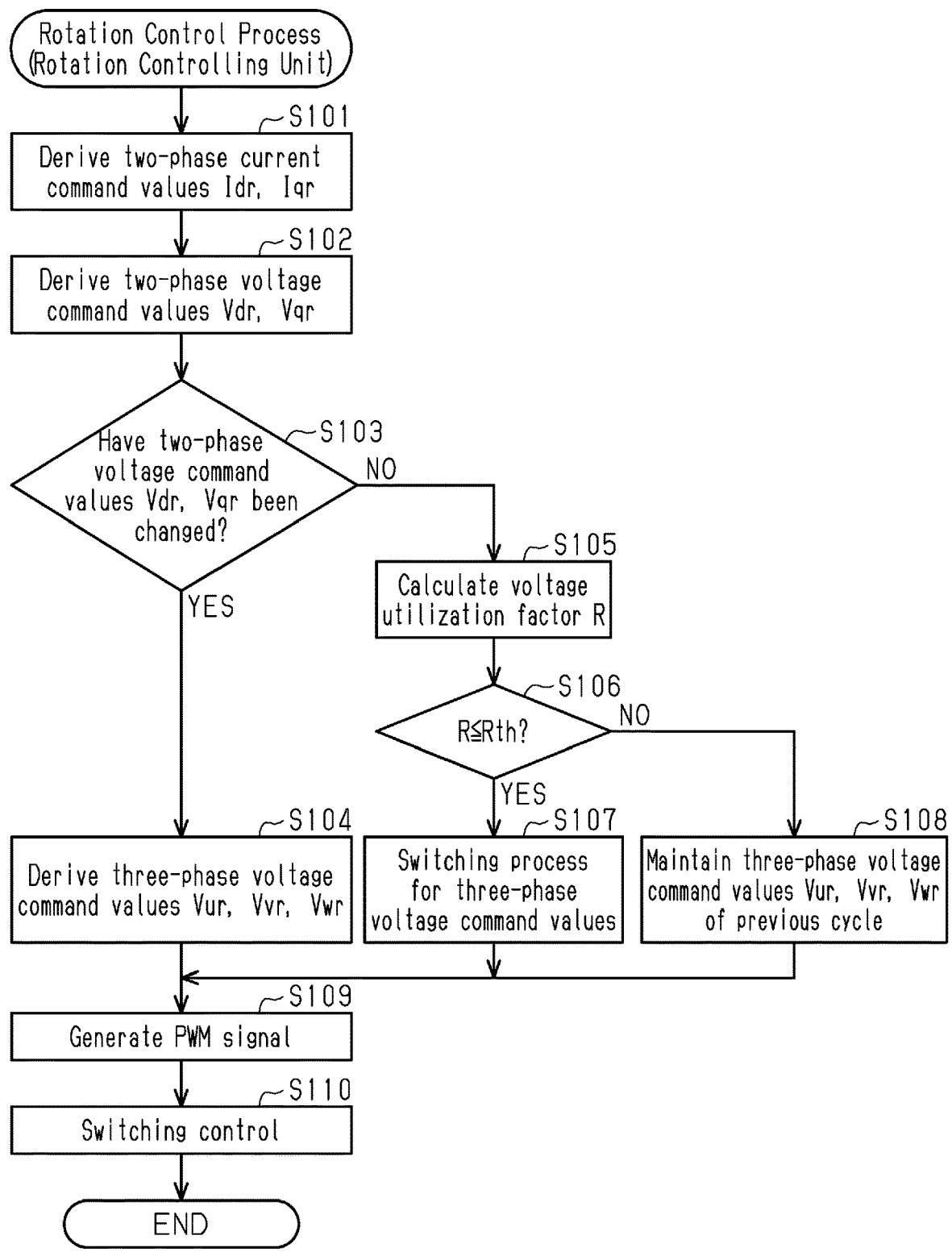
FIG. 3 is a flowchart showing a rotation control process.

As shown in FIG. 3, the rotation controlling unit 36 first derives, in step S101, the two-phase current command values Idr, Iqr based on the external command value (the command rotation speed Nc in the present embodiment) obtained by the obtaining unit 35, and the actual rotation speed Nr, which is acquired (estimated, in the present embodiment) by the position and speed estimating unit 34. The two-phase current command values Idr, Iqr are a d-axis current command value Idr, which is a target value of the d-axis current Id, and a q-axis current command value Iqr, which is a target value of the q-axis current Iq.

Thereafter, in step S102, the rotation controlling unit 36 derives two-phase voltage command values Vdr, Vqr based on the two-phase current command values Idr, Iqr and the two-phase currents Id, Iq obtained by the three-phase/two-phase converter 33. The two-phase voltage command values Vdr, Vqr include a d-axis voltage command value Vdr and a q-axis voltage command value Vqr. The d-axis voltage command value Vdr is a target value of the voltage applied to the d-axis of the vehicle on-board electric motor 11, and the q-axis voltage command value Vqr is a target value of the voltage applied to the q-axis of the vehicle on-board electric motor 11.

The rotation controlling unit 36 outputs the two-phase voltage command values Vdr, Vqr to the position and speed estimating unit 34. The position and speed estimating unit 34 uses at least one of the two-phase voltage command values Vdr, Vqr to estimate the position and the actual rotation speed Nr of the rotor 22.

In steps S103 to S108, the rotation controlling unit 36 executes a process that derives three-phase voltage command values Vur, Vvr, Vwr based on the two-phase voltage command values Vdr, Vqr.

The three-phase voltage command values Vur, Vvr, Vwr include a u-phase voltage command value Vur, a v-phase voltage command value Vvr, and a w-phase voltage command value Vwr. The u-phase voltage command value Vur is a target value of the voltage applied to the u-phase coil 24u. The v-phase voltage command value Vvr is a target value of the voltage applied to the v-phase coil 24v. The w-phase voltage command value Vwr is a target value of the voltage applied to the w-phase coil 24w.

The rotation controlling unit 36 determines, in step S103, whether the two-phase voltage command values Vdr, Vqr derived in the current cycle have been changed from the two-phase voltage command values Vdr, Vqr derived in the previous cycle. Specifically, the rotation controlling unit 36 includes a memory area in which the two-phase voltage command values Vdr, Vqr derived in the previous cycle are stored, and derives the two-phase voltage command values Vdr, Vqr of the previous cycle from the memory area to compare them with the two-phase voltage command values Vdr, Vqr derived in the current cycle.

When the two-phase voltage command values Vdr, Vqr derived in the current cycle are different from the two-phase voltage command values Vdr, Vqr derived in the previous cycle, the external command value has been changed, or the actual rotation speed Nr or the acceleration has been changed.

When the two-phase voltage command values Vdr, Vqr derived in the current cycle are different from the two-phase voltage command values Vdr, Vqr derived in the previous cycle, a line voltage that is different from the currently applied line voltage needs to be applied to the three-phase coils 24u, 24v, 24w. In this case, the rotation controlling unit 36 proceeds to step S104 and derives the three-phase voltage command values Vur, Vvr, Vwr that correspond to the two-phase voltage command values Vdr, Vqr derived in the current cycle.

In the present embodiment, the rotation controlling unit 36 derives, in steps S104, three-phase reference command values Vu0, Vv0, Vw0, which correspond to the two-phase voltage command values Vdr, Vqr that are newly derived in the current cycle.

The three-phase reference command values Vu0, Vv0, Vw0 change in accordance with the electrical angle. For example, the three-phase reference command values Vu0, Vv0, Vw0 each have a waveform having a reference amplitude f0, of which one period corresponds to 0° to 360° of the electrical angle. The three-phase reference command values Vu0, Vv0, Vw0 have different phases that are displaced, for example, by 120° from one another. The three-phase reference command values Vu0, Vv0, Vw0 may have any waveform such as a sine wave, a triangular wave, a rectangular wave, or a combination of these waveforms.

In the present embodiment, the three-phase reference command values Vu0, Vv0, Vw0 are the three-phase voltage command values Vur, Vvr, Vwr of which a neutral point potential En is constant. The neutral point potential En is the potential of the neutral point of the three-phase voltage command values Vur, Vvr, Vwr. The three-phase reference command values Vu0, Vv0, Vw0 are obtained by subjecting the two-phase voltage command values Vdr, Vqr to two-phase to three-phase conversion.

The rotation controlling unit 36 of the present embodiment derives the three-phase reference command values Vu0, Vv0, Vw0 by using mapping data. Specifically, as shown in FIG. 2, the rotation controlling unit 36 of the present embodiment has first mapping data 36a that is used to derive the three-phase reference command values Vu0, Vv0, Vw0. The first mapping data 36a sets the correspondence between the two-phase voltage command values Vdr, Vqr and the three-phase reference command values Vu0, Vv0, Vw0. In step S104, the rotation controlling unit 36 refers to the first mapping data 36a to derive the three-phase reference command values Vu0, Vv0, Vw0 that correspond to the two-phase voltage command values Vdr, Vqr derived in the current cycle.

When the two-phase voltage command values Vdr, Vqr derived in the current cycle are the same as the two-phase voltage command values Vdr, Vqr derived in the previous cycle, the rotation controlling unit 36 calculates a voltage utilization factor R based on the two-phase voltage command values Vdr, Vqr and the power supply voltage Vin in step S105 as shown in FIG. 3.

The voltage utilization factor R is the utilization factor of the power supply voltage Vin required to apply the two-phase voltage command values Vdr, Vqr to the vehicle on-board electric motor 11. For example, the voltage utilization factor R is the ratio of the effective value of the two-phase voltage command values Vdr, Vqr to the power supply voltage Vin, or a parameter obtained by adding a predetermined correction parameter to that ratio or by multiplying the ratio by the predetermined correction parameter.

Since the line voltage of the three-phase coils 24u, 24v, 24w changes in accordance with the two-phase voltage command values Vdr, Vqr, the voltage utilization factor R can be regarded as the ratio of the line voltage of the three-phase coils 24u, 24v, 24w to the power supply voltage Vin. In other words, the voltage utilization factor R is a parameter that indicates the utilization factor of the power supply voltage Vin in order that the line voltage of the three-phase coils 24u, 24v, 24w becomes a value that corresponds to the two-phase voltage command values Vdr, Vqr.

The reference amplitude f0, which is the amplitude of the three-phase reference command values Vu0, Vv0, Vw0, decreases as the voltage utilization factor R decreases. For example, if the reference amplitude f0 in a case in which the voltage utilization factor R is a first voltage utilization factor R1 and the reference amplitude f0 in a case in which the voltage utilization factor R is a second voltage utilization factor R2, which is less than the first voltage utilization factor R1, are compared to each other, the reference amplitude f0 in a case in which the voltage utilization factor R is the second voltage utilization factor R2 is less than the reference amplitude f0 in a case in which the voltage utilization factor R is the first voltage utilization factor R1.

When the reference amplitude f0 decreases, the variation range of the three-phase reference command values Vu0, Vv0, Vw0 (specifically, the range from the minimum value to the maximum value) is likely to narrow.

After calculating the voltage utilization factor R, the rotation controlling unit 36 proceeds to step S106. In step S106, the rotation controlling unit 36 determines whether the voltage utilization factor R obtained in step S105 is less than or equal to a predetermined utilization factor threshold Rth. The utilization factor threshold Rth may have any value, and may be less than or greater than 50%, for example. The utilization factor threshold Rth may be set to a value within the range from 40 to 70%, for example.

When the voltage utilization factor R is less than or equal to the utilization factor threshold Rth, the rotation controlling unit 36 executes a command value switching process that switches the three-phase voltage command values Vur, Vvr, Vwr in step S107.

Specifically, the rotation controlling unit 36 of the present embodiment at least derives first three-phase voltage command values Vur1, Vvr1, Vwr1 and second three-phase voltage command values Vur2, Vvr2, Vwr2, which have different variation ranges from each other. The rotation controlling unit 36 switches between the first three-phase voltage command values Vur1, Vvr1, Vwr1 and the second three-phase voltage command values Vur2, Vvr2, Vwr2 at a switching period. For example, the rotation controlling unit 36 alternately derives the first three-phase voltage command values Vur1, Vvr1, Vwr1 and the second three-phase voltage command values Vur2, Vvr2, Vwr2 each time the process of step S107 is executed.

For example, if the three-phase voltage command values Vur, Vvr, Vwr derived in step S107 in the previous cycle are the first three-phase voltage command values Vur1, Vvr1, Vwr1, the rotation controlling unit 36 derives the second three-phase voltage command values Vur2, Vvr2, Vwr2 in step S107 in the current cycle.

If the three-phase voltage command values Vur, Vvr, Vwr derived in step S107 in the previous cycle are the second three-phase voltage command values Vur2, Vvr2, Vwr2, the rotation controlling unit 36 derives the first three-phase voltage command values Vur1, Vvr1, Vwr1 in step S107 in the current cycle.

In the present embodiment, the first three-phase voltage command values Vur1, Vvr1, Vwr1 and the second three-phase voltage command values Vur2, Vvr2, Vwr2 are both values of the three-phase modulation method. The three-phase modulation method is a method that constantly subjects the switching elements Qu1 to Qw2 of all phases to a periodic ON-OFF operation.

The rotation controlling unit 36 derives the three-phase reference command values Vu0, Vv0, Vw0, of which the neutral point potential En is constant, as the first three-phase voltage command values Vur1, Vvr1, Vwr1. The rotation controlling unit 36 also derives three-phase change command values Vuf, Vvf, Vwf, of which the neutral point potential En changes with a neutral point amplitude fn, as the second three-phase voltage command values Vur2, Vvr2, Vwr2.

Specifically, as shown in FIG. 2, the rotation controlling unit 36 has second mapping data 36b, which is used to derive the three-phase change command values Vuf, Vvf, Vwf, in addition to the first mapping data 36a. The second mapping data 36b sets the correspondence between the two-phase voltage command values Vdr, Vqr and the three-phase change command values Vuf, Vvf, Vwf.

The three-phase change command values Vuf, Vvf, Vwf are obtained by superimposing the neutral point potential En of the neutral point amplitude fn on the three-phase reference command values Vu0, Vv0, Vw0. That is, the three-phase change command values Vuf, Vvf, Vwf are obtained by adding (or subtracting) the neutral point potential En to (or from) the three-phase reference command values Vu0, Vv0, Vw0, which change in accordance with the electrical angle, while changing the neutral point potential En with the neutral point amplitude fn in accordance with the electrical angle. In other words, the three-phase change command values Vuf, Vvf, Vwf are waveforms obtained by superimposing the neutral point potential En of the neutral point amplitude fn on the waveforms of the three-phase reference command values Vu0, Vv0, Vw0.

With the above-described configuration, since the neutral point potential En of the three-phase change command values Vuf, Vvf, Vwf changes with the neutral point amplitude fn, the variation range of the three-phase change command values Vuf, Vvf, Vwf is wider than the variation range of the three-phase reference command values Vu0, Vv0, Vw0. The period of the neutral point potential En, which is superimposed, is 120°, for example. The variation range of the three-phase change command values Vuf, Vvf, Vwf is enlarged as the neutral point amplitude fn increases.

As described above, when the two-phase voltage command values Vdr, Vqr are changed, the three-phase reference command values Vu0, Vv0, Vw0 are derived as the first three-phase voltage command values Vur1, Vvr1, Vwr1 in step S104. Thus, the rotation controlling unit 36 derives the three-phase change command values Vuf, Vvf, Vwf as the second three-phase voltage command values Vur2, Vvr2, Vwr2 in step S107, which is the first step after the two-phase voltage command values Vdr, Vqr are changed.

As shown in FIG. 3, when the voltage utilization factor R is greater than the utilization factor threshold Rth, the rotation controlling unit 36 executes, in step S108, a process that maintains the three-phase voltage command values Vur, Vvr, Vwr derived in the previous cycle. Specifically, the rotation controlling unit 36 derives the three-phase voltage command values Vur, Vvr, Vwr that are the same as the three-phase voltage command values Vur, Vvr, Vwr derived in the previous cycle.

After deriving the three-phase voltage command values Vur, Vvr, Vwr, the rotation controlling unit 36 generates, in step S109, a PWM signal that sets a switching pattern (specifically, a duty cycle) of the three-phase switching elements Qu1 to Qw2 based on the three-phase voltage command values Vur, Vvr, Vwr and a carrier signal.

In step S110, the rotation controlling unit 36 performs switching control of the three-phase switching elements Qu1 to Qw2 by outputting the generated PWM signal to the three-phase switching elements Qu1 to Qw2. That is, the inverter controller 14 uses the PWM signal to perform PWM control of the three-phase switching elements Qu1 to Qw2 by using the PWM signal.

With this configuration, in a case in which the two-phase voltage command values Vdr, Vqr is not changed, two sets of the three-phase voltage command values Vur, Vvr, Vwr of different variation ranges are alternately derived at a switching period (an execution period of the rotation control process in the present embodiment), and the PWM signal corresponding to the three-phase voltage command values Vur, Vvr, Vwr is output.

In view of the fact that the three-phase voltage command values Vur, Vvr, Vwr are switched and a PWM signal is output each time the rotation control process is executed, the switching period, at which the variation range is switched to another value while the three-phase voltage command values Vur, Vvr, Vwr maintain the line voltage, can be regarded as the output period of the PWM signal.

In the present embodiment, the switching period is the same as a carrier period, which is the period of the carrier signal. That is, the inverter controller 14 of the present embodiment is configured to switch the three-phase voltage command values Vur, Vvr, Vwr at each carrier period.

In the present embodiment, the rotation controlling unit 36 executing the processes of steps S101, S102 corresponds to a two-phase voltage command value deriving unit. The rotation controlling unit 36 executing the processes of steps S103 to S108 corresponds to a three-phase voltage command value deriving unit, and the rotation controlling unit 36 executing the process of step S109 corresponds to a generating unit.

The description is based on the flowchart for the illustrative purposes, the order of processes of steps S103 to S108 may be changed. As described above, part or all of the processes of steps S103 to S108 may be executed by a dedicated hardware circuit.

Figure 4:
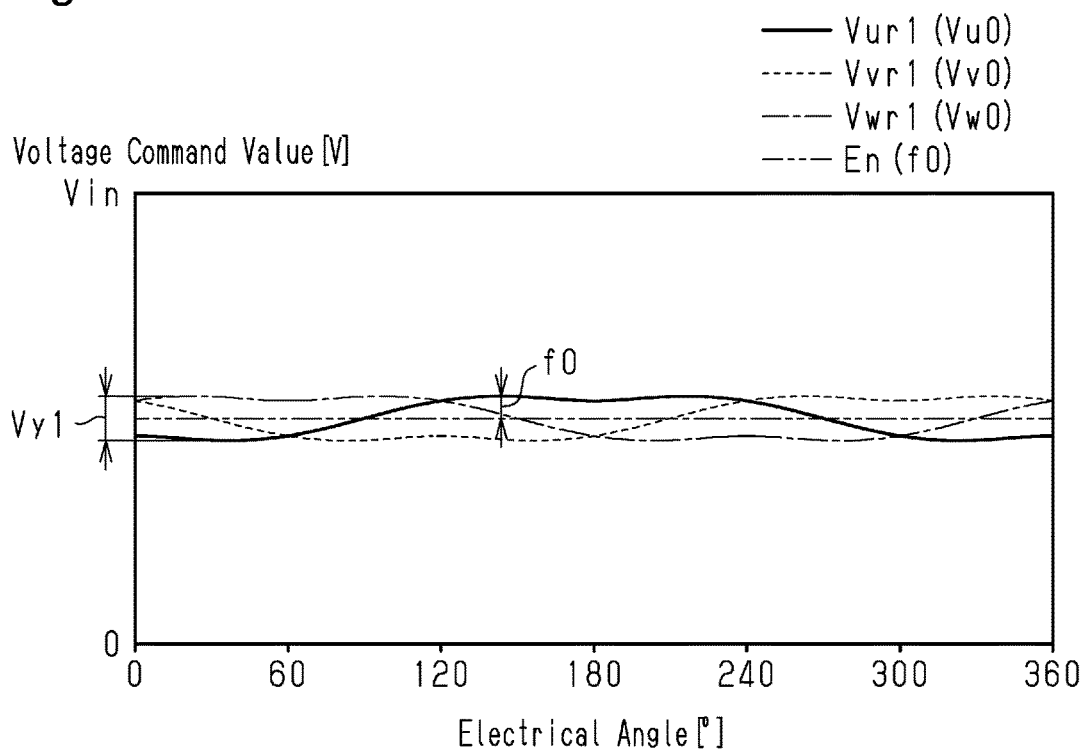
FIG. 4 is a graph showing three-phase reference command values as an example of first three-phase voltage command values.
Figure 5:
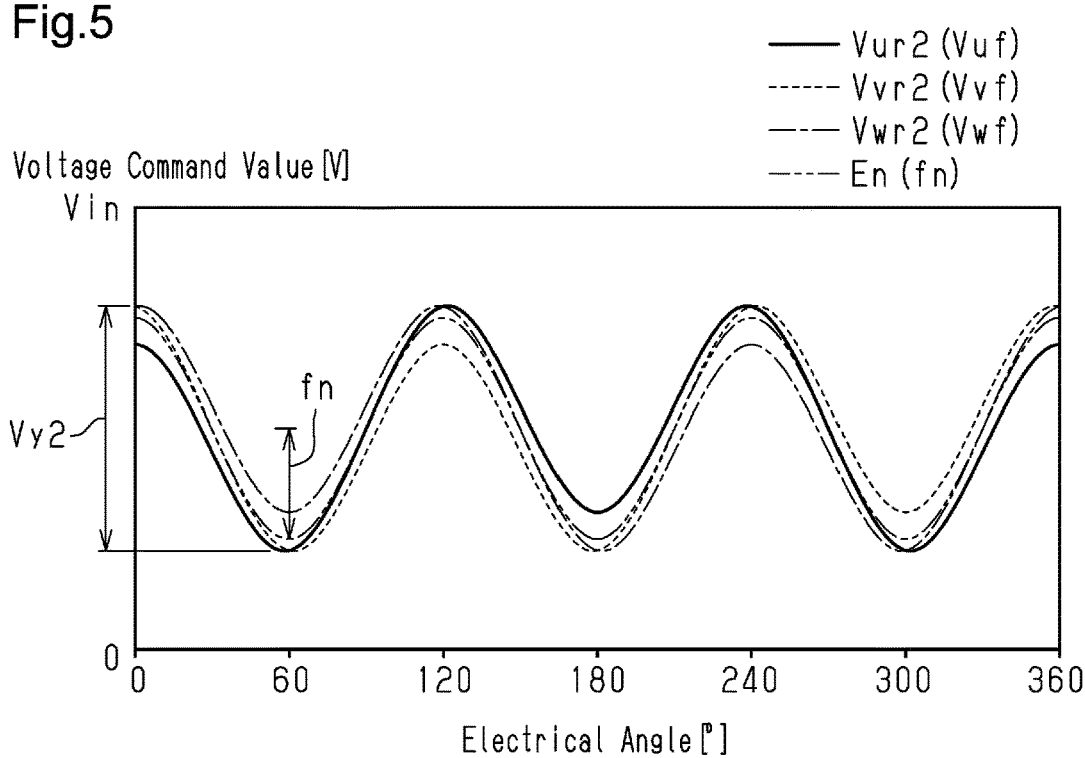
FIG. 5 is a graph showing three-phase change command values as an example of second three-phase voltage command values.

An operation of the present embodiment will now be described with reference to FIGS. 4 to 6. FIG. 4 is a graph of the three-phase reference command values Vu0, Vv0, Vw0 as the first three-phase voltage command values Vur1, Vvr1, Vwr1. FIG. 5 is a graph of the three-phase change command values Vuf, Vvf, Vwf as the second three-phase voltage command values Vur2, Vvr2, Vwr2. In FIGS. 4 and 5, the two-phase voltage command values Vdr, Vqr are the same, and the voltage utilization factor R is less than the utilization factor threshold Rth.

As shown in FIG. 4, the first three-phase voltage command values Vur1, Vvr1, Vwr1 (the three-phase reference command values Vu0, Vv0, Vw0 in the present embodiment) change within a first variation range Vy1. When the voltage utilization factor R decreases, the first variation range Vy1 narrows. Thus, in a situation in which the voltage utilization factor R is less than or equal to the utilization factor threshold Rth, the first variation range Vy1 is likely to narrow.

In contrast, the three-phase change command values Vuf, Vvf, Vwf as the second three-phase voltage command values Vur2, Vvr2, Vwr2 change to a greater extent than the three-phase reference command values Vu0, Vv0, Vw0 as shown in FIG. 5. Specifically, when the variation range of the second three-phase voltage command values Vur2, Vvr2, Vwr2 (the three-phase change command values Vuf, Vvf, Vwf in the present embodiment) is referred to as a second variation range Vy2, the second variation range Vy2 is wider than the first variation range Vy1. Thus, the three-phase reference command values Vu0, Vv0, Vw0 and the three-phase change command values Vuf, Vvf, Vwf have different values except at an electrical angle corresponding to the node of the neutral point potential En. Thus, since the derived three-phase voltage command values Vur, Vvr, Vwr are switched to the three-phase reference command values Vu0, Vv0, Vw0 and the three-phase change command values Vuf, Vvf, Vwf at each switching period, the three-phase voltage command values Vur, Vvr, Vwr are changed with the switching period at substantially all the electrical angles. Therefore, in a situation in which the two-phase voltage command values Vdr, Vqr are the same, the three-phase voltage command values Vur, Vvr, Vwr are unlikely to become the same value at the switching period.

Even if the neutral point potential En is superimposed, the line voltage applied to the three-phase coils 24u, 24v, 24w does not change. Thus, even if the three-phase change command values Vuf, Vvf, Vwf are derived, the vehicle on-board electric motor 11 receives a torque equivalent to the three-phase reference command values Vu0, Vv0, Vw0.

The present embodiment, which has been described above, achieves the following advantages.

(1) The inverter controller 14 is used to control the inverter circuit 13, which drives the vehicle on-board electric motor 11 using the vehicle on-board electricity storage device 104. The vehicle on-board electric motor 11 includes the three-phase coils 24u, 24v, 24w, and the inverter circuit 13 includes the three-phase switching elements Qu1 to Qw2.

The inverter controller 14 includes the position and speed estimating unit 34, the voltage sensor 31, and the rotation controlling unit 36. The position and speed estimating unit 34 is configured to acquire the actual rotation speed Nr, which is the rotation speed of the vehicle on-board electric motor 11. The voltage sensor 31 is configured to acquire a power supply voltage Vin, which is the voltage of the vehicle on-board electricity storage device 104. The rotation controlling unit 36 is configured to execute a process that derives the two-phase voltage command values Vdr, Vqr, which are target values of the voltages applied to the d-axis and the q-axis of the vehicle on-board electric motor 11, based on the external command value delivered from an external device and the actual rotation speed Nr, and a process that derives the three-phase voltage command values Vur, Vvr, Vwr based on the two-phase voltage command values Vdr, Vqr. The rotation controlling unit 36 is configured to generate a PWM signal based on the three-phase voltage command values Vur, Vvr, Vwr and the carrier signal. The rotation controlling unit 36 is also configured to use the PWM signal to perform PWM control of the three-phase switching elements Qu1 to Qw2.

The rotation controlling unit 36 is configured such that, in a case in which the voltage utilization factor R, which is calculated based on the two-phase voltage command values Vdr, Vqr and the power supply voltage Vin, is less than or equal to the utilization factor threshold Rth in the process of deriving the three-phase voltage command values Vur, Vvr, Vwr, the rotation controlling unit 36 derives, by switching at the switching period, sets of the three-phase voltage command values Vur, Vvr, Vwr of which the line voltages of the vehicle on-board electric motor 11 are the same and the variation ranges are different.

With this configuration, when the voltage utilization factor R is less than or equal to the utilization factor threshold Rth, the three-phase voltage command values Vur, Vvr, Vwr are switched to ones having a different variation range at the switching period, with the line voltage of the three-phase coils 24u, 24v, 24w being maintained. Accordingly, the three-phase voltage command values Vur, Vvr, Vwr changes at the switching period even if the two-phase voltage command values Vdr, Vqr are the same. This reduces noise of a specific frequency generated when the three-phase voltage command values Vur, Vvr, Vwr periodically become the same value in a situation where a voltage utilization factor R is low.

Specifically, if the same three-phase voltage command values Vur, Vvr, Vwr are derived periodically, the three-phase voltage command values Vur, Vvr, Vwr have the same values periodically. This generates noise of a specific frequency that corresponds to the deriving period of the three-phase voltage command values Vur, Vvr, Vwr. The influence of the noise of the specific frequency is likely to increase when the voltage utilization factor R is low.

In this regard, the present embodiment derives sets of the three-phase voltage command values Vur, Vvr, Vwr of which the variation range is different at the switching period when the voltage utilization factor R is less than or equal to the utilization factor threshold Rth. This causes the three-phase voltage command values Vur, Vvr, Vwr to vary at each switching period. This reduces the frequency of the three-phase voltage command values Vur, Vvr, Vwr having the same values periodically, thereby reducing the noise of the specific frequency.

Particularly, with the present configuration, the line voltage applied to the three-phase coils 24*u*, 24*v*, 24*w* remains the same even when the three-phase voltage command values Vur, Vvr, Vwr are switched. Accordingly, the same torque is applied to the vehicle on-board electric motor 11. This prevents torque applied to the vehicle on-board electric motor 11 from being different due to switching of the three-phase voltage command values Vur, Vvr, Vwr.

This configuration reduces noise of the specific frequency generated when the three-phase voltage command values Vur, Vvr, Vwr periodically become the same value in a situation where the voltage utilization factor R is low, while maintaining the state in which an appropriate torque is applied to the vehicle on-board electric motor 11.

(2) The rotation controlling unit 36 does not switch the three-phase voltage command values Vur, Vvr, Vwr when the voltage utilization factor R is greater than the utilization factor threshold Rth. This reduces the processing load due to switching of the three-phase voltage command values Vur, Vvr, Vwr. When the voltage utilization factor R is greater than the utilization factor threshold Rth, the three-phase voltage command values Vur, Vvr, Vwr are likely to increase. The noise of the specific frequency is thus likely to decrease relative to the three-phase voltage command values Vur, Vvr, Vwr. Accordingly, the influence of the noise of the specific frequency is likely to decrease. Therefore, a small influence is generated by not switching the three-phase voltage command values Vur, Vvr, Vwr under a situation in which the voltage utilization factor R is greater than the utilization factor threshold Rth.

(3) The rotation controlling unit 36 controls the three-phase switching elements Qu1 to Qw2 by outputting a PWM signal to the three-phase switching elements Qu1 to Qw2 at the predetermined output period. The switching period, at which the three-phase voltage command values Vur, Vvr, Vwr are switched, is the output period of the PWM signal.

This configuration switches the three-phase voltage command values Vur, Vvr, Vwr each time a PWM signal is output. This prevents the three-phase voltage command values Vur, Vvr, Vwr input to the three-phase coils 24*u*, 24*v*, 24*w* from becoming the same values consecutively.

(4) The switching period, at which the three-phase voltage command values Vur, Vvr, Vwr are switched, is the same as the carrier period, which is the period of the carrier signal.

This configuration reduces noise of a frequency corresponding to the carrier period since the three-phase voltage command values Vur, Vvr, Vwr are switched at the carrier period.

(5) At each switching period, the rotation controlling unit 36 switches the derived three-phase voltage command values Vur, Vvr, Vwr alternately between the first three-phase voltage command values Vur1, Vvr1, Vwr1 and the second three-phase voltage command values Vur2, Vvr2, Vwr2, which have a wider variation range than the first three-phase voltage command values Vur1, Vvr1, Vwr1.

With this configuration, the alternate switching between the first three-phase voltage command values Vur1, Vvr1, Vwr1 and the second three-phase voltage command values Vur2, Vvr2, Vwr2 allows the three-phase voltage command values Vur, Vvr, Vwr to vary, while preventing the three-phase voltage command values Vur, Vvr, Vwr from unevenly concentrating on a specific value.

Specifically, if the three-phase voltage command values Vur, Vvr, Vwr become the first three-phase voltage command values Vur1, Vvr1, Vwr1 more frequently than the second three-phase voltage command values Vur2, Vvr2, Vwr2, noise corresponding to the first three-phase voltage command values Vur1, Vvr1, Vwr1 is likely to increase.

In this regard, the present embodiment switches the three-phase voltage command values Vur, Vvr, Vwr alternately to the first three-phase voltage command values Vur1, Vvr1, Vwr1 and the second three-phase voltage command values Vur2, Vvr2, Vwr2. Accordingly, the noise corresponding to the first three-phase voltage command values Vur1, Vvr1, Vwr1 becomes substantially equal to the noise corresponding to the second three-phase voltage command values Vur2, Vvr2, Vwr2. This prevents either one of the noises from being excessively greater than the other.

The following explanation supports the above description. When the three-phase voltage command values Vur, Vvr, Vwr are alternately switched to the first three-phase voltage command values Vur1, Vvr1, Vwr1 and the second three-phase voltage command values Vur2, Vvr2, Vwr2, the three-phase voltage command values Vur, Vvr, Vwr become the first three-phase voltage command values Vur1, Vvr1, Vwr1 or the second three-phase voltage command values Vur2, Vvr2, Vwr2 at a period twice as long as the switching period. This generates a first noise, which corresponds to the three-phase voltage command values Vur, Vvr, Vwr becoming the first three-phase voltage command values Vur1, Vvr1, Vwr1 at a period twice as long as the switching period, and a second noise, which corresponds to the three-phase voltage command values Vur, Vvr, Vwr becoming the second three-phase voltage command values Vur2, Vvr2, Vwr2 at a period twice as long as the switching period. The noises are less than the noise generated when the three-phase voltage command values Vur, Vvr, Vwr become the same values at the switching period. Accordingly, the noise of the specific frequency is reduced even in this case. In other words, the noise generated by the three-phase voltage command values Vur, Vvr, Vwr becoming the same values periodically is split to the first noise and the second noise. This is considered to reduce the noise of the specific frequency, which is generated by the three-phase voltage command values Vur, Vvr, Vwr becoming the same values periodically.

(6) The first three-phase voltage command values Vur1, Vvr1, Vwr1 are the three-phase reference command values Vu0, Vv0, Vw0, of which the neutral point potential En is constant. The second three-phase voltage command values Vur2, Vvr2, Vwr2 are the three-phase change command values Vuf, Vvf, Vwf, which are obtained by superimposing the neutral point potential En, which has the neutral point amplitude fn, on the three-phase reference command values Vu0, Vv0, Vw0.

With this configuration, the second variation range Vy2, which is the variation range of the three-phase change command values Vuf, Vvf, Vwf, is wider than the first variation range Vy1, which is the variation range of the three-phase reference command values Vu0, Vv0, Vw0, by the amount corresponding to the change of the neutral point potential En by the neutral point amplitude fn. On the other hand, the line voltage is the same between the first three-phase voltage command values Vur1, Vvr1, Vwr1 and the second three-phase voltage command values Vur2, Vvr2, Vwr2. Accordingly, the variation range of the three-phase voltage command values Vur, Vvr, Vwr can be varied while maintaining the line voltages of the first variation range Vy1 and the line voltage of the second variation range Vy2 at the same value.

(7) The rotation controlling unit 36 has the first mapping data 36*a*, which is used to derive the three-phase reference command values Vu0, Vv0, Vw0 as the first three-phase voltage command values Vur1, Vvr1, Vwr1. The rotation controlling unit 36 has the second mapping data 36*b*, which is used to derive the three-phase change command values Vuf, Vvf, Vwf as the second three-phase voltage command values Vur2, Vvr2, Vwr2. The rotation controlling unit 36 switches the mapping data to be referred to, thereby switching the three-phase voltage command values Vur, Vvr, Vwr to be derived.

This configuration eliminates the necessity for calculation of the three-phase voltage command values Vur, Vvr, Vwr each time the three-phase voltage command values Vur, Vvr, Vwr are switched. This eliminates the processing load of calculation of the three-phase voltage command values Vur, Vvr, Vwr in the rotation controlling unit 36 (in other words, the inverter controller 14). Accordingly, the increase in the processing load due to switching of the three-phase voltage command values Vur, Vvr, Vwr is reduced.

The above-described embodiment may be modified as follows. The above-described embodiment and the following modifications may be combined as long as the combined modifications remain technically consistent with each other.

The first three-phase voltage command values Vur1, Vvr1, Vwr1 are values of the three-phase modulation method, and the second three-phase voltage command values Vur2, Vvr2, Vwr2 may be values obtained through the two-phase modulation method. That is, the rotation controlling unit 36 may switch between the three-phase voltage command values Vur, Vvr, Vwr of the three-phase modulation method and the three-phase voltage command values Vur, Vvr, Vwr of the two-phase modulation method, such that the line voltages become the same.

The two-phase modulation method is a method that sequentially stops periodic ON-OFF operation of a switching element of one phase out of the switching elements Qu1 to Qw2 of all phases at every predetermined period (phase angle). That is, the two-phase modulation method is a method that stops the periodic ON-OFF operation of a switching element of one of the three phases sequentially, and executes periodic ON-OFF operations of the power switching elements of the other two phases. The state in which the periodic ON-OFF operation of a switching element is stopped refers to a state in which the switching element remains switched ON or OFF.

Figure 6:
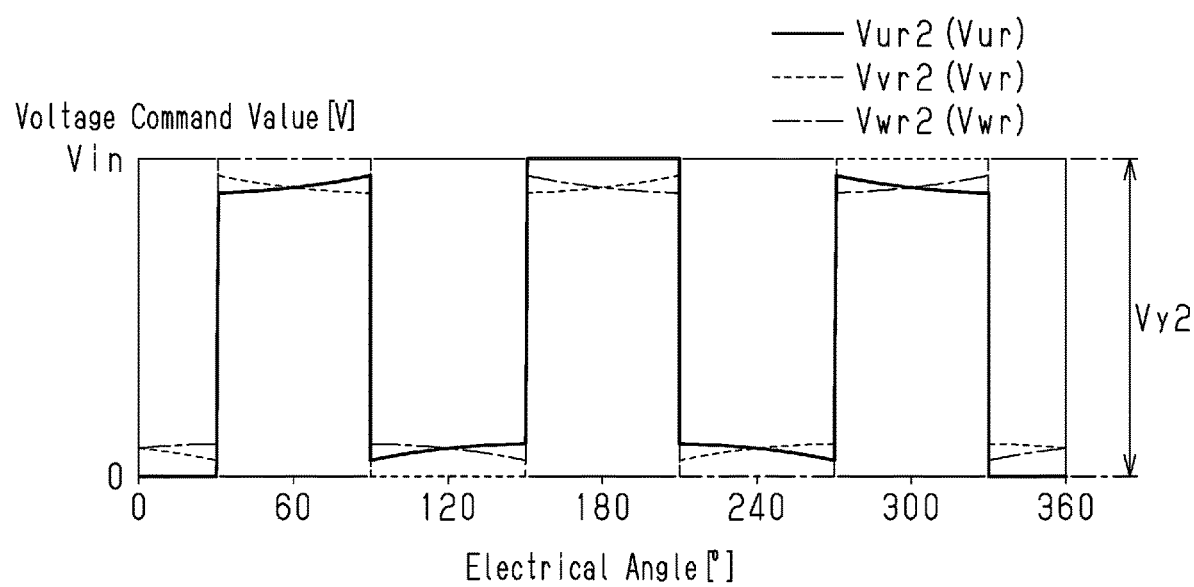
FIG. 6 is a graph showing three-phase voltage command values of a two-phase modulation method.

As shown in FIG. 6, the variation range of the three-phase voltage command values Vur, Vvr, Vwr of the two-phase modulation method is from 0 V to the power supply voltage Vin. Accordingly, the second variation range Vy2, which is the variation range of the second three-phase voltage command values Vur2, Vvr2, Vwr2, is wider than the first variation range Vy1, which is the variation range of the first three-phase voltage command values Vur1, Vvr1, Vwr1. On the other hand, the line voltage of the first three-phase voltage command values Vur1, Vvr1, Vwr1 is the same as the line voltage of the second three-phase voltage command values Vur2, Vvr2, Vwr2. Thus, even in this case, the above-described advantage (1) can be achieved.

The three-phase voltage command values Vur, Vvr, Vwr of the three-phase modulation method may be the three-phase reference command values Vu0, Vv0, Vw0 or the three-phase change command values Vuf, Vvf, Vwf.

The first three-phase voltage command values Vur1, Vvr1, Vwr1 may be first three-phase change command values Vuf1, Vvf1, Vwf1, of which the neutral point potential En changes with a first neutral point amplitude fn1. Also, the second three-phase voltage command values Vur2, Vvr2, Vwr2 may be second three-phase change command values Vuf2, Vvf2, Vwf2, of which the neutral point potential En changes with a second neutral point amplitude fn2. The first three-phase change command values Vuf1, Vvf1, Vwf1 are obtained by superimposing the neutral point potential En of the first neutral point amplitude fn1 on the three-phase reference command values Vu0, Vv0, Vw0. The second three-phase change command values Vuf2, Vvf2, Vwf2 are obtained by superimposing the neutral point potential En of the second neutral point amplitude fn2 on the three-phase reference command values Vu0, Vv0, Vw0. The second neutral point amplitude fn2 may be greater than the first neutral point amplitude fn1.

With this configuration, the second neutral point amplitude fn2 is greater than the first neutral point amplitude fn1. Accordingly, the second variation range Vy2 (specifically, the variation range of the second three-phase change command values Vuf2, Vvf2, Vwf2) is wider than the first variation range Vy1 (specifically, the variation range of the first three-phase change command values Vuf1, Vvf1, Vwf1). On the other hand, the line voltage of the first three-phase voltage command values Vur1, Vvr1, Vwr1 and the line voltage of the second three-phase voltage command values Vur2, Vvr2, Vwr2 are the same. Accordingly, the variation range of the three-phase voltage command values Vur, Vvr, Vwr can be varied while maintaining the line voltage of the first variation range Vy1 and the line voltage of the second variation range Vy2 at the same value.

The rotation controlling unit 36 may be configured to derive three or more sets of the three-phase voltage command values Vur, Vvr, Vwr that have different variation ranges. The rotation controlling unit 36 may include, for example, the first mapping data 36*a*, which corresponds to the three-phase reference command values Vu0, Vv0, Vw0, the second mapping data 36*b*, which corresponds to the first three-phase change command values Vuf1, Vvf1, Vwf1, and third mapping data, which corresponds to the second three-phase change command values Vuf2, Vvf2, Vwf2. The rotation controlling unit 36 may switch the mapping data to be referred to, thereby deriving the three-phase reference command values Vu0, Vv0, Vw0, the first three-phase change command values Vuf1, Vvf1, Vwf1, and the second three-phase change command values Vuf2, Vvf2, Vwf2. In this case, the rotation controlling unit 36 may switch among the three sets of the three-phase voltage command values Vur, Vvr, Vwr either in a predetermined order or at random. That is, it suffices if the rotation controlling unit 36 derives at least two sets of the three-phase voltage command values Vur, Vvr, Vwr of which the line voltages are the same and the variation ranges are different. The rotation controlling unit 36 does not need to alternately switch between the first three-phase voltage command values Vur1, Vvr1, Vwr1 and the second three-phase voltage command values Vur2, Vvr2, Vwr2.

The switching period, at which the three-phase voltage command values Vur, Vvr, Vwr are switched, may be changed, for example, to a period longer than the carrier period. The switching period may be longer than the output period of the PWM signal. The switching period may be twice as long as the output period, for example. Specifically, the rotation controlling unit 36 may, for example, derive the first three-phase voltage command values Vur1, Vvr1, Vwr1 two or more times before switching the three-phase voltage command values Vur, Vvr, Vwr to the second three-phase voltage command values Vur2, Vvr2, Vwr2.

The rotation controlling unit 36 may be configured to, in a single cycle of the rotation control process, derive the first three-phase voltage command values Vur1, Vvr1, Vwr1 and the second three-phase voltage command values Vur2, Vvr2, Vwr2, and sequentially output two PWM signals at an interval longer than or equal to the carrier period. That is, the execution period of the rotation control process may agree with or does not necessarily need to agree with the switching period or the output period.

The specific configuration that derives the three-phase voltage command values Vur, Vvr, Vwr is not particularly limited. For example, the rotation controlling unit 36 may derive, through calculation, the first three-phase voltage command values Vur1, Vvr1, Vwr1 and the second three-phase voltage command values Vur2, Vvr2, Vwr2, without using the mapping data 36a, 36b.

The configuration that acquires the actual rotation speed Nr is not limited to the position and speed estimating unit 34. For example, a dedicated sensor (resolver) may be employed. That is, the speed acquiring unit is not limited to the one that acquires the actual rotation speed Nr by estimating it, but may be a configuration, such as a resolver, that actually detects the actual rotation speed Nr.

The specific configuration of the obtaining unit 35 is not particularly limited as long as it is capable of receiving external command values delivered from the air conditioning ECU 103. For example, in the configuration in which the air conditioning ECU 103 delivers commands using wireless signals, the obtaining unit 35 may be a module that receives the wireless signals.

The configuration that acquires the power supply voltage Vin, which is the voltage of the vehicle on-board electricity storage device 104, is not limited to the voltage sensor 31. For example, in a case in which the vehicle on-board electricity storage device 104 is provided with the voltage sensor 31, which detects the power supply voltage Vin, and a battery CPU electrically connected to the voltage sensor 31, the rotation controlling unit 36 may obtain the power supply voltage Vin by communicating with the battery CPU. In this case, the rotation controlling unit 36 communicating with the battery CPU corresponds to the voltage acquiring unit.

The vehicle on-board motor-driven compressor 10 does not necessarily need to be employed in the vehicle on-board air conditioner 101, but may be employed in another apparatus. For example, if the vehicle 100 is a fuel cell vehicle, the vehicle on-board motor-driven compressor 10 may be employed in the air supplying device that supplies air to the fuel cell. That is, the fluid to be compressed is not limited to refrigerant, but may be any fluid such as air.

The vehicle on-board fluid machine is not limited to the vehicle on-board motor-driven compressor 10 provided with the compression unit 12, which compresses fluid. For example, in the case in which the vehicle 100 is a fuel cell vehicle, the vehicle on-board fluid machine may be an electric pump device having a pump that supplies hydrogen to the fuel cell and a vehicle on-board electric motor that drives the pump. In this case, the inverter controller 14 may be used to control the vehicle on-board electric motor that drives the pump.

The vehicle on-board electric motor 11 does not necessarily need to be employed in the vehicle on-board motor-driven compressor 10, but may be employed in any apparatus mounted on the vehicle. For example, the vehicle on-board electric motor 11 may be a driving motor that drives the vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An inverter controller configured to control an inverter circuit that drives a vehicle on-board electric motor by using a vehicle on-board electricity storage device, wherein
the vehicle on-board electric motor includes three-phase coils,
the inverter circuit includes three-phase switching elements,
the inverter controller comprising:
speed acquiring circuitry configured to acquire a rotation speed of the vehicle on-board electric motor;
voltage acquiring circuitry configured to acquire a power supply voltage, which is a voltage of the vehicle on-board electricity storage device;
a rotation controlling circuitry configured to:
derive two-phase voltage command values based on an external command value delivered from an external device and an acquisition result of the speed acquiring circuitry, the two-phase voltage command values being target values of voltages applied to a d-axis and a q-axis of the vehicle on-board electric motor;
derive three-phase voltage command values applied to the three-phase coils based on the two-phase voltage command values; and
generate a pulse-width modulation (PWM) signal based on the three-phase voltage command values and a carrier signal, wherein
the inverter controller is configured to subject the three-phase switching elements to pulse-width modulation (PWM) control using the PWM signal, and
the rotation controlling circuitry is configured such that, in a case in which a voltage utilization factor, which is calculated based on the two-phase voltage command values and the acquisition result of the voltage acquiring circuitry, is less than or equal to a predetermined utilization factor threshold, in a situation in which the two-phase voltage command values are not changed from previous values, the rotation controlling circuit derives, by switching at a switching period, sets of the three-phase voltage command values of which line voltages of the three-phase coils are the same and variation ranges are different,
wherein the rotation controlling circuitry is configured to derive, as sets of the three-phase voltage command values of which line voltages of the vehicle on-board electric motor are the same and variation ranges are different, at least first three-phase voltage command values, and second three-phase voltage command values, of which a variation range is wider than that of the first three-phase voltage command values, wherein the first three-phase voltage command values are first three-phase change command values, of which a neutral point potential changes with a first neutral point amplitude, and wherein the second three-phase voltage command values are second three-phase change command values, of which a neutral point potential changes with a second neutral point amplitude, which is greater than the first neutral point amplitude.

2. The inverter controller according to claim 1, wherein the inverter controller is configured to subject the three-phase switching elements to the PWM control by outputting the PWM signal to the three-phase switching elements at a predetermined output period, and the switching period is the output period.

3. The inverter controller according to claim 1, wherein the switching period is the same as a carrier period, which is a period of the carrier signal.

4. The inverter controller according to claim 1, wherein the rotation controlling circuitry is configured to switch, at the switching period, the derived three-phase voltage command values alternately to the first three-phase voltage command values and the second three-phase voltage command values.

5. The inverter controller according to claim 1, wherein the first three-phase voltage command values are values of a three-phase modulation method, and the second three-phase voltage command values are values of a two-phase modulation method.

6. The inverter controller according to claim 1, the inverter controller further comprising:

first mapping data that is used to derive the first three-phase voltage command values; and second mapping data that is used to derive the second three-phase voltage command values, wherein the rotation controlling circuitry switches the mapping data to be referred to, thereby switching the three-phase voltage command values to be derived.

7. A vehicle on-board fluid machine comprising:

a vehicle on-board electric motor;

an inverter circuit configured to drive the vehicle on-board electric motor by using a vehicle on-board electricity storage device; and an inverter controller configured to control the inverter circuit, wherein the vehicle on-board electric motor includes three-phase coils, the inverter circuit includes three-phase switching elements, the inverter controller includes:

speed acquiring circuitry configured to acquire a rotation speed of the vehicle on-board electric motor;

unit voltage acquiring circuitry configured to acquire a power supply voltage, which is a voltage of the vehicle on-board electricity storage device; and rotation controlling circuitry configured to:

derive two-phase voltage command values based on an external command value delivered from an external device and an acquisition result of the speed acquiring circuitry, the two-phase voltage command values being target values of voltages applied to a d-axis and a q-axis of the vehicle on-board electric motor;

derive three-phase voltage command values applied to the three-phase coils based on the two-phase voltage command values; and generate a pulse-width modulation (PWM) signal based on the three-phase voltage command values and a carrier signal, wherein the inverter controller is configured to subject the three-phase switching elements to pulse-width modulation (PWM) control using the PWM signal, and wherein the rotation controlling circuitry is configured such that, in a case in which a voltage utilization factor, which is calculated based on the two-phase voltage command values and the acquisition result of the voltage acquiring circuitry, is less than or equal to a predetermined utilization factor threshold, in a situation in which the two-phase voltage command values are not changed from previous values, the rotation controlling circuitry derives, by switching at a switching period, sets of the three-phase voltage command values of which line voltages of the three-phase coils are the same and variation ranges are different, wherein the rotation controlling circuitry is configured to derive, as sets of the three-phase voltage command values of which line voltages of the vehicle on-board electric motor are the same and variation ranges are different, at least first three-phase voltage command values, and second three-phase voltage command values, of which a variation range is wider than that of the first three-phase voltage command values, wherein the first three-phase voltage command values are first three-phase change command values, of which a neutral point potential changes with a first neutral point amplitude, and wherein the second three-phase voltage command values are second three-phase change command values, of which a neutral point potential changes with a second neutral point amplitude, which is greater than the first neutral point amplitude.

8. The vehicle on-board fluid machine according to claim 7, wherein the vehicle on-board fluid machine is a vehicle on-board motor-driven compressor that includes a compression circuitry driven by the vehicle on-board electric motor.

* * * * *